United States Patent
Shi et al.

(10) Patent No.: US 12,302,411 B2
(45) Date of Patent: May 13, 2025

(54) METHOD FOR MONITORING CONTROL CHANNEL, TERMINAL DEVICE AND NETWORK DEVICE

(71) Applicant: GUANGDONG OPPO MOBILE TELECOMMUNICATIONS CORP., LTD., Dongguan (CN)

(72) Inventors: Cong Shi, Dongguan (CN); Weijie Xu, Dongguan (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 588 days.

(21) Appl. No.: 17/548,028

(22) Filed: Dec. 10, 2021

(65) Prior Publication Data

US 2022/0104252 A1  Mar. 31, 2022

Related U.S. Application Data

(63) Continuation of application No. PCT/CN2019/090797, filed on Jun. 11, 2019.

(51) Int. Cl.
*H04W 74/0833*  (2024.01)
*H04W 24/08*  (2009.01)
(Continued)

(52) U.S. Cl.
CPC ......... *H04W 74/085* (2013.01); *H04W 24/08* (2013.01); *H04W 72/0446* (2013.01);
(Continued)

(58) Field of Classification Search
CPC ............... H04W 74/085; H04W 24/08; H04W 72/0446; H04W 74/006; H04W 74/0866;
(Continued)

(56) References Cited

U.S. PATENT DOCUMENTS

2016/0366670 A1* 12/2016 Feng ..................... H04L 27/362
2018/0270756 A1  9/2018 Bhattad et al.
(Continued)

FOREIGN PATENT DOCUMENTS

CN  104919746 A  9/2015
CN  104956612 A  9/2015
(Continued)

OTHER PUBLICATIONS

Cat, PDCCH-Based Power Saving Signal/Channel Design, 3GPP TSG RAN 2G1 Meeting #97, R1-1906350, Reno, USA, May 13-17, 2019, 14 pgs. (Year: 2019).*
(Continued)

*Primary Examiner* — Phirin Sam
*Assistant Examiner* — Louis Samara
(74) *Attorney, Agent, or Firm* — Morgan, Lewis & Bockius LLP

(57) ABSTRACT

Embodiments of the present application relate to a method, a terminal device and a network device for monitoring a control channel. The method includes: in a physical downlink control channel (PDCCH) search space, receiving, by a terminal device, a first PDCCH on at least one serving cell among multiple serving cells, where the first PDCCH is used for providing the terminal device a PDCCH skipping indication; performing, by the terminal device, PDCCH skipping according to the indication of the first PDCCH.

14 Claims, 5 Drawing Sheets

(51) Int. Cl.
  *H04W 72/0446* (2023.01)
  *H04W 74/00* (2009.01)
  *H04W 74/08* (2009.01)
  *H04W 76/20* (2018.01)

(52) U.S. Cl.
  CPC ..... *H04W 74/006* (2013.01); *H04W 74/0866* (2013.01); *H04W 76/20* (2018.02)

(58) Field of Classification Search
  CPC ......... H04W 76/20; H04W 8/04; H04W 8/24; H04B 17/309; H04B 7/024; H04L 25/0204; H04J 11/0069
  See application file for complete search history.

(56) References Cited

U.S. PATENT DOCUMENTS

| | | | | |
|---|---|---|---|---|
| 2018/0309532 | A1* | 10/2018 | Shimezawa | H04J 11/0069 |
| 2019/0223164 | A1* | 7/2019 | He | H04L 5/0053 |
| 2020/0128557 | A1* | 4/2020 | Suzuki | H04W 8/04 |
| 2020/0404669 | A1* | 12/2020 | Seo | H04L 25/0238 |
| 2021/0120577 | A1* | 4/2021 | Jiang | H04W 72/23 |
| 2021/0351865 | A1* | 11/2021 | Ouchi | H04W 8/24 |

FOREIGN PATENT DOCUMENTS

| | | | |
|---|---|---|---|
| CN | 108353393 | A | 7/2018 |
| CN | 109429258 | | 3/2019 |
| WO | WO2014/190550 | | 12/2014 |
| WO | WO-2019031850 | A1 * | 2/2019 ............. H04B 7/024 |
| WO | WO2020/248143 | A1 | 12/2020 |

OTHER PUBLICATIONS

Guangdong OPPO Mobile Telecommunications Corp., Ltd., CN201980091748.8, Notice of Reexamination, Aug. 30, 2023, 12 pgs.
Guangdong OPPO Mobile Telecommunications Corp., Ltd., CN201980091748.8, Decision of Reexamination, Oct. 25, 2023, 28 pgs.
Guangdong OPPO Mobile Telecommunications Corp., Ltd., CN201980091748.8, Decision of Rejection, Oct. 26, 2022, 28 pgs.
Anonymous, 3GPP TR 38.840 V2.0.0 (May 2018), 3rd Generation Partnership Project; Technical Specification Group Radio Access Network; NR; Study on UE Power Saving (Release 16), 74 pgs.
Guangdong OPPO Mobile Telecommunications Corp., Ltd., Extended European Search Report, EP 19933159.6, May 12, 2022, 11 pgs.
Guangdong OPPO Mobile Telecommunications Corp., Ltd., Second Office Action, CN 201980091748.8, Jul. 14, 2022, 26 pgs.
CATT, PDCCH skipping and switching of PDCCH monitoring periodicity, 3GPP TSG RAN 2G1 Meeting #97, R1-1906353, Reno, USA, May 13-17, 2019, 6 pgs.
CATT, PDCCH-Based Power Saving Signal/Channel Design, 3GPP TSG RAN 2G1 Meeting #97, R1-1906350, Reno, USA, May 13-17, 2019, 14 pgs.
CATT, New SID; Study on UE Power Saving in NR, 3GPP TSG RAN Meetings #80, La Jolla, USA, Jun. 11-14, 2018, 5 pgs.
Guangdong OPPO Mobile Telecommunications Corp., Ltd., International Search Report and Written Opinion, PCT/CN2019/090797, Mar. 5, 2020, 13 pgs.
Guangdong OPPO Mobile Telecommunications Corp., Ltd., EP19933159.6, First Office Action, Mar. 9, 2023, 10 pgs.
Guangdong OPPO Mobile Telecommunications Corp., Ltd., First Office Action, CN201980091748.8, Jan. 26, 2022, 20 pgs.

* cited by examiner

METHOD FOR MONITORING CONTROL CHANNEL, TERMINAL DEVICE AND NETWORK DEVICE

CROSS-REFERENCE TO RELATED APPLICATION

This application is a continuation of International Patent Application No. PCT/CN2019/090797 filed with China's State Intellectual Property Office on Jun. 11, 2019, entitled "POWER CONTROL METHOD, TERMINAL DEVICE AND NETWORK DEVICE", the disclosure of which is incorporated herein by reference in its entirety.

TECHNICAL FIELD

The present application relates to the field of communications, and in particular to a method, a terminal device and a network device for monitoring control channels.

BACKGROUND

In a communication system, such as a 5th generation (5G) mobile communication system, carrier aggregation (CA) technology can be introduced to increase a data transmission rate of a terminal device and improve user experience.

Currently, users have higher requirements for the energy consumption of the terminal device.

SUMMARY

Embodiments of the present application provide a method, terminal device, and network device for monitoring a control channel, so that the power consumption of the terminal device can be dynamically reduced in the CA scenario.

A first aspect provides a method for monitoring a control channel, including: in a physical downlink control channel (PDCCH) search space, receiving, by a terminal device, a first PDCCH on at least one serving cell among multiple serving cells, where the first PDCCH is used for indicating PDCCH skipping to the terminal device; and performing, by the terminal device, the PDCCH skipping according to indication of the first PDCCH.

A second aspect provides a terminal device, including a processor and a memory, the memory is configured to store a computer program, and the processor is configured to call the computer program stored in the memory and run the computer program, to execute operations of: in a physical downlink control channel (PDCCH) search space, receiving a first PDCCH on at least one serving cell among multiple serving cells, where the first PDCCH is used for indicating PDCCH skipping to the terminal device; and performing PDCCH skipping according to indication of the first PDCCH.

A third aspect provides a network device including a processor and a memory, the memory is configured to store a computer program, and the processor is configured to call the computer program stored in the memory and run the computer program, to execute operations of: in a physical downlink control channel (PDCCH) search space, transmitting a first PDCCH on at least one serving cell among multiple serving cells, and the first PDCCH is used for indicating PDCCH skipping to a terminal device.

DETAILED DESCRIPTION

The technical solutions of the embodiments of the present application will be described below with reference to the accompanying drawings of the embodiments of the present application. Apparently, only a part of the embodiments, not all the embodiments of the present application, are described. All other embodiments obtained, based on the embodiments described in the present application, by those skilled in the art without paying creative efforts shall fall within the protection scope of the present application.

Embodiments of the present disclosure can be applied to various communication systems, such as, a Global System of Mobile Communication (GSM), a Code Division Multiple Access (CDMA) system, a Wideband Code Division Multiple Access (WCDMA) system, a General Packet Radio Service (GPRS) system, a Long Term Evolution (LTE) system, an advanced long term evolution (LTE-A) system, a New Radio (NR) system, an evolution system of the NR system, a LTE-based access to unlicensed spectrum (LTE-U) system, a NR-based access to unlicensed spectrum (NR-U) system, an Universal Mobile Telecommunication System (UMTS), a Wireless Local Area Networks (WLAN) system, a Wireless Fidelity (WiFi) system, a next-generation communication system or other communication systems, etc.

Generally speaking, traditional communication systems support a limited number of connections and are easy to implement. However, with the development of communication technologies, mobile communication systems will support not only traditional communications, but also communications such as Device to Device (D2D) communication, Machine to Machine (M2M) communication, Machine Type Communication (MTC), and Vehicle to Vehicle (V2V) communication, etc. Embodiments of the present disclosure can also be applied to such communication systems.

Optionally, the communication system in the embodiments of the present disclosure may be applied to a carrier aggregation (CA) scenario, a Dual Connectivity (DC) scenario, or a standalone (SA) scenario.

Figure 1:
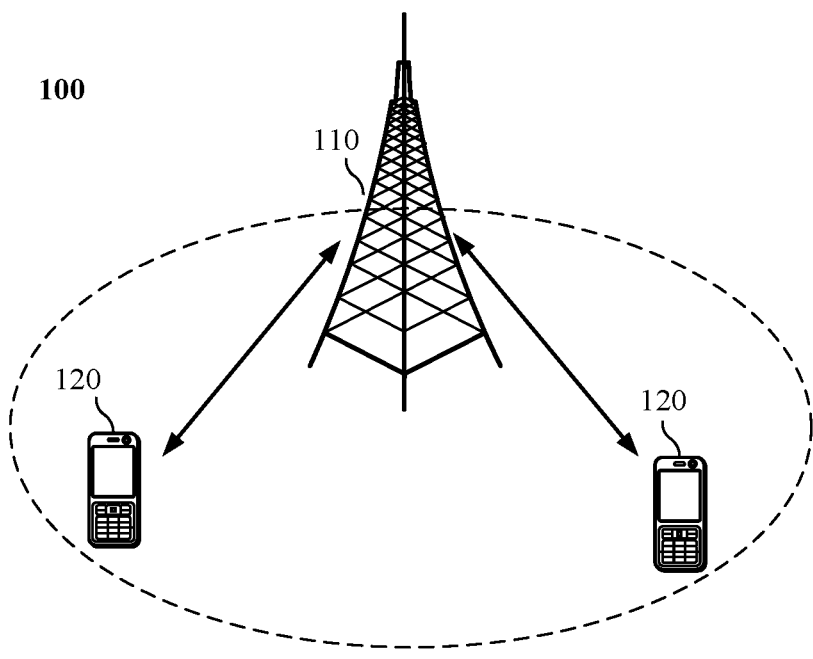
FIG. 1 is a schematic diagram illustrating a communication system architecture provided by embodiments of the present application.

For example, a communication system 100 to which embodiments of the present application are applied is shown in FIG. 1. The communication system 100 can include a network device 110 communicating with a terminal device 120 (or referred to as a communication terminal, or a terminal). The network device 110 can provide communication coverage over a specific geographic area, and can communicate with terminal devices located in the coverage area. Optionally, the network device 110 may be a base transceiver station (BTS) in a GSM system or a CDMA system, or a Node B (NB) in a WCDMA system, or an evolutional Node B (eNB or eNode B) in an LTE system, or a radio controller in a cloud radio access network (CRAN). Optionally, the network device may be a mobile switching center, a relay station, an access point, an in-vehicle device, a wearable device, a hub, a switch, a network bridge, a router, a network side device in the 5G network, or a network device in the future evolution of the public land mobile network (PLMN), etc.

The communication system 100 further includes at least one terminal device 120 located in the coverage area of the network device 110. The "terminal device" as used herein includes, but are not limited to, devices connected via a wired line, such as a connection via Public Switched Telephone Networks (PSTN), a Digital Subscriber Line (DSL), a digital cable and a direct cable; and/or another data connection/network; and/or via a wireless interface, such as cellular network, Wireless Local Area Network (WLAN), digital television network such as DVB-H network, satellite network and an AM-FM broadcast transmitter; and/or a device of another terminal configured to receive/send communication signals; and/or an Internet of things (IOT) device. A terminal device configured to communicate via a wireless interface can be referred to as "a wireless communication terminal", "a wireless terminal" or "a mobile terminal". Examples of mobile terminals include, but are not limited to, satellite or cellular phones; Personal Communications System (PCS) terminals integrated with capabilities of cellular radio phones, data processing, fax, and data communication; a PDA that can include radio phones, pagers, Internet/intranet accessing, Web browser, memo pad, calendar, and/or Global Positioning System (GPS) receiver; and conventional laptop and/or palmtop receivers or other electronic device including radio telephone transceivers. The terminal device can refer to access terminals, user equipment (UE), user units, user stations, mobile stations, mobile platforms, remote stations, remote terminals, mobile equipment, user terminals, terminals, wireless communication equipment, user agents, or user devices. The access terminal may be a cellular phone, a cordless phone, a Session Initiation Protocol (SIP) phone, a wireless local loop (WLL) station, a personal digital assistant (PDA), computing devices, handheld devices having wireless communication functions, or other processing devices connected to wireless modems, in-vehicle devices, wearable devices, terminal devices in 5G networks, or terminal devices in the future evolution of PLMN, etc.

The network device 110 provides services for a cell, and the terminal device 120 communicates with the network device 110 through transmission resources (for example, frequency domain resources, or spectrum resources) used by the cell. The cell may be a cell corresponding to the network device 110 (for example, a base station), the cell may belong to a macro base station or belong to a base station corresponding to a small cell. The small cell here can include: a metro cell, a micro cell, a pico cell, a femto cell, etc. These small cells have the characteristics of small coverage and low transmission power, and are suitable for providing high-speed data transmission services.

FIG. 1 exemplarily illustrates one network device and two terminal devices. Optionally, the communication system 100 may include multiple network devices, and the number of terminal devices within the coverage of each network device is not limited to be two, which is not limited in the embodiments of the present application.

Optionally, the communication system 100 may further include other network entities such as a network controller and a mobility management entity, which is not limited in the embodiment of the present disclosure.

It should be understood that a device with communication functions in the network/system in the embodiments of the present disclosure may be referred to as a communication device. Taking the communication system 100 shown in FIG. 1 as an example, communication devices may include the network device 110 and the terminal device 120 having communication functions, and the network device 110 and the terminal device 120 may be specific devices described above, which will not be repeated here. The communication devices may also include other devices in the communication system 100, such as the network controller, the mobile management entity and other network entities, which are not limited in the embodiments of the present disclosure.

It should be understood that the terms "system" and "network" herein are generally interchangeable herein. The term "and/or" herein is only used to describe an association relationship between associated objects, which represents that there may be three kinds of relationships. For example, A and/or B may represent three situations: A exists alone, A and B exist at the same time, and B exists alone. In addition, the character "/" herein generally represents an "or" relationship between pre and post associated objects.

In some embodiments of the present application, the communication system 100 may be a 5G NR system. The 5G NR can further increase the system bandwidth on the basis of 4G to provide a greater data transmission rate, thereby improving user experience. For example, in 5G NR, for frequency bands below 6 GHz, the maximum bandwidth supported by a single carrier can be 100 MHz; for frequency bands above 6 GHz, the maximum bandwidth supported by a single carrier can be 400 MHz.

Like the LTE system, the 5G NR can also support the CA technology. For example, for a terminal device that supports the CA characteristics, the network device can configure multiple serving cells for the terminal device, so that the terminal device can transmit and receive data on the multiple serving cells at the same time, thereby increasing the data transmission rate.

On the other hand, for a large carrier bandwidth, such as 100 HMz, the bandwidth that the terminal device can use is often very limited. Accordingly, the power consumption of the terminal device will be a great challenge if the terminal device detects and measures on the entire bandwidth, which is adverse to the power saving of the terminal device. In view of this, the 5G NR introduces a concept of a bandwidth part (BWP), that is, a terminal device can transmit and receive data on a part of continuous bandwidth (i.e., BWP) within a carrier of the entire large bandwidth. The terminal device only performs related operations within such bandwidth part configured by the network device, so that the power consumption of the terminal device is reduced.

For each serving cell of the terminal device, the network device can configure, through radio resource control (RRC) configuration information, one or more BWPs for the terminal device on the serving cell. For example, at most 4 BWPs can be configured. At each moment, the terminal device can have only one activated downlink (DL) BWP and one activated uplink (UL) BWP on this serving cell, and the terminal device can only transmit and receive data on the activated BWPs.

Further, BWP switching can be achieved in the following 4 ways:
1. BWP switching based on Physical Downlink Control Channel (PDCCH);
2. BWP switching based on RRC (re)configuration;
3. BWP switching based on timer timeout;
4. BWP switching caused by random access initialization.

The terminal device obtains downlink or uplink scheduling information by receiving the PDCCH transmitted from the network device, thereby further completing the reception and transmission of service data. Since the time when the network device schedules the terminal device is not fixed, and no related signaling is provided to inform the terminal device whether the network device has transmitted the PDCCH to it, thus it is necessary for the terminal device to perform PDCCH blind detection.

In the current 5G NR standardization process, in view of power saving for the terminal device, a PDCCH skipping mechanism is considered to be introduced in the Rel-16 version, that is, the network can transmit a dynamic signaling to instruct the terminal device to skip PDCCH monitoring for a period.

For the CA scenario, how to control the terminal device to perform the PDCCH skipping on multiple serving cells has not yet been clearly defined. In view of this, the embodiments of the present application propose a method for monitoring a control channel, which can cause the terminal device to perform the PDCCH skipping on multiple serving cells in the CA scenario, thereby dynamically reducing the power consumption of the terminal device.

Figure 2:
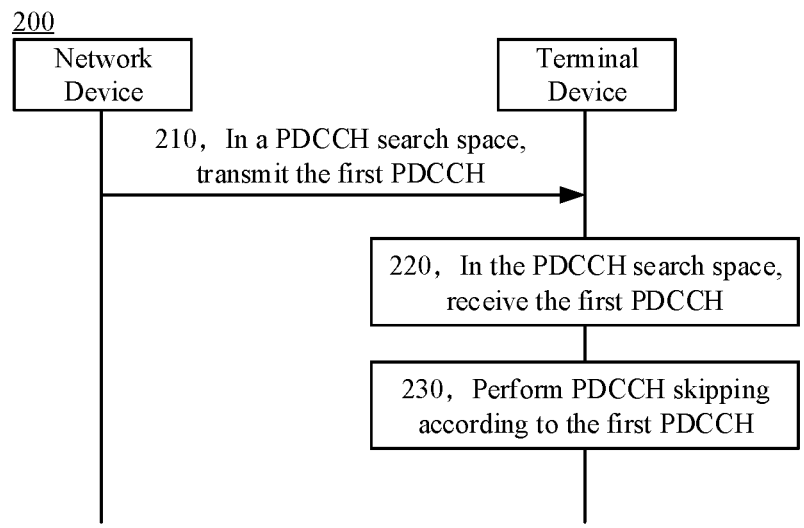
FIG. 2 is a schematic flowchart of a method for monitoring a control channel according to embodiments of the present application.

FIG. 2 is a schematic flowchart illustrating a method 200 for monitoring a control channel according to some embodiments of the present application. The method described in FIG. 2 may be executed by a terminal device and a network device. The terminal device may be, for example, the terminal device 120 shown in FIG. 1, and the network device may be, for example, the network device 110 shown in FIG. 1. As shown in FIG. 2, the method 200 may include at least part of the following contents.

In 210, in a PDCCH search space, the network device transmits a first PDCCH on at least one serving cell among multiple serving cells, and the first PDCCH is used to instruct the terminal device not to monitor the PDCCH (PDCCH skipping).

In 220, in the PDCCH search space, the terminal device receives the first PDCCH on at least one serving cell among the multiple serving cells.

In 230, the terminal device performs PDCCH skipping according to the first PDCCH.

The number of the first PDCCH may be one or more than one, which is not specifically limited in the present disclosure. For example, when the network device transmits the first PDCCH on four serving cells of the terminal device respectively, the number of the first PDCCH is four. As another example, when the network device transmits the first PDCCH on one serving cell of the terminal device, the number of the first PDCCH is one.

The multiple serving cells mentioned above may include one primary cell (PCell) and one or more secondary cells (SCell). The terminal device can simultaneously transmit and receive data on the PCell and one or more activated SCells, thereby increasing the data transmission rate.

The SCell has two states, that is, the activated state and the inactive state. When the SCell is in the activated state, the terminal device can transmit and receive data on the SCell. For a SCell configured by the network device for the terminal device, the initial state thereof is the inactive state. The activation/deactivation of the SCell can be achieved in the following two ways:
1. indicating the activation/deactivation of the SCell through a Media Access Control (MAC) control element (CE).
2. deactivating the SCell based on timeout of a timer.

In the embodiments of the present application, the PDCCH search space can be understood as a PDCCH resource set where the blind detection needs to be performed by the terminal device. In this way, the PDCCH blind detection set of the terminal device can be restricted, thereby reducing the complexity of PDCCH blind detection of the terminal device.

The network device may configure one or more PDCCH search spaces for each BWP of the terminal device. The terminal device can monitor the PDCCH only on the PDCCH search spaces corresponding to the currently activated BWPs, so as to complete data transmission and reception.

In some embodiments the network device may configure the PDCCH search space(s) for the terminal device through configuration information. For example, the network device may transmit RRC configuration information including the PDCCH search space(s) to the terminal device.

In some embodiments the RRC configuration information may further include but not limited to at least one of:
(a) Scell configuration parameters, and the Scell configuration parameters may include but are not limited to at least one of: frequency and a physical cell identity (PCI) of the Scell, a Scell identity, a Scell index;
(b) at least one DL BWP for each serving cell among multiple serving cells;
(c) at least one PDCCH search space on the DL BWP of each serving cell;
(d) at least one PDCCH skipping duration that each serving cell can support, that is, a PDCCH skipping duration set.

In some embodiments of the present application, the duration when the terminal device performs the PDCCH skipping (for the convenience of description, referred to as the first PDCCH skipping duration value) may be preset on the terminal device according to the protocol.

Alternatively, the first PDCCH skipping duration value may be negotiated in advance by the terminal device and the network device, and preset on the terminal device.

Alternatively, in addition to indicating scheduling information of the terminal device, the first PDCCH may also be used for indicating the first PDCCH skipping duration value. Indicating the first PDCCH skipping duration value through the first PDCCH may include two situations.

Situation I

The network device may pre-configure a PDCCH skipping duration set for each serving cell through the RRC configuration information, and the PDCCH skipping duration set includes the first PDCCH skipping duration value. In this case, the first PDCCH may be used for indicating an index or number of the first PDCCH skipping duration value in the PDCCH skipping duration set. For example, for the PCell, the PDCCH skipping duration set pre-configured by the network device for the terminal device includes 2 slots, 4 slots, 8 slots, and 16 slots. The indexes of the 4 PDCCH skipping duration values are 0, 1, 2 and 3 respectively. If the first PDCCH skipping duration value is 4 slots, the first PDCCH may indicate index 1.

Alternatively, the first PDCCH may be used for indicating the first PDCCH skipping duration value in the PDCCH skipping duration set. For example, for the PCell, the PDCCH skipping duration set pre-configured by the network device for the terminal device includes 2 slots, 4 slots, 8 slots, and 16 slots. If the first PDCCH skipping duration value is 4 slots, the first PDCCH may indicate 4 slots.

Situation II

The network device does not preconfigure the PDCCH skipping duration set, and the first PDCCH carries an indication of the first PDCCH skipping duration value.

Figure 3:
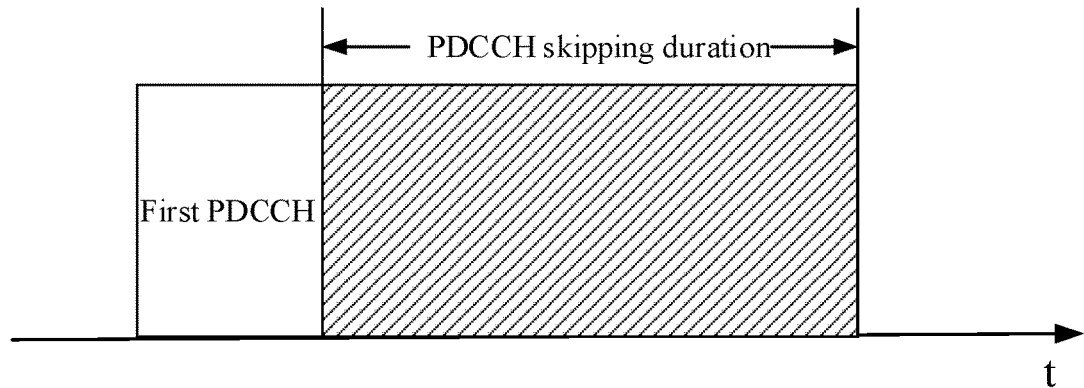
FIG. 3 is a schematic diagram illustrating a method of determining a starting time of PDCCH skipping according to embodiments of the present application.

In the embodiments of the present application, a starting time for the terminal device to perform the PDCCH skipping may have multiple selections. As an example, referring to FIG. 3, the starting time for the terminal device to perform the PDCCH skipping may be a starting time of a next time unit after the first PDCCH is received by the terminal device. That is, the terminal device does not monitor the PDCCH since the next time unit after the reception of the first PDCCH is completed.

The time unit may be a subframe, a slot, a time domain symbol, or a short transmission timing interval (sTTI), etc.

As another example, the starting time for the terminal device to perform the PDCCH skipping may be a starting time of a next time unit after the transmission of a physical uplink shared channel (PUSCH) or a physical uplink control channel (PUCCH) scheduled by the first PDCCH succeeds. That is, the terminal device will not monitor the PDCCH after completing the uplink transmission scheduled by the first PDCCH.

Figure 4:
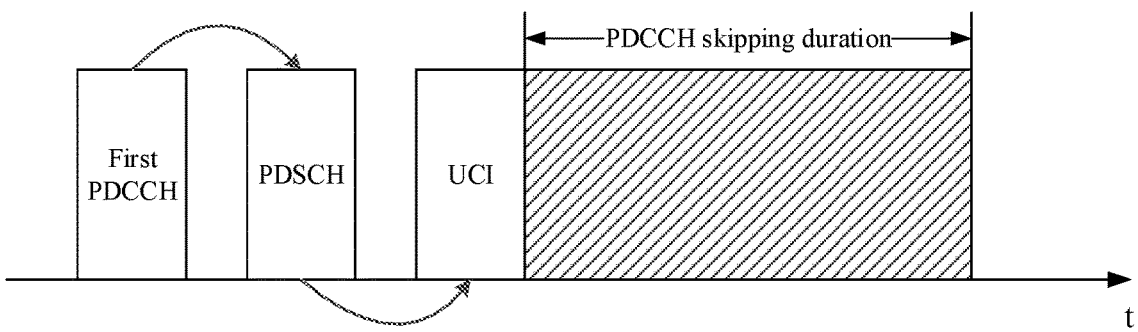
FIG. 4 is a schematic diagram illustrating another method of determining a starting time of PDCCH skipping according to embodiments of the present application.

If the first PDCCH schedules the downlink data transmission of the terminal device, as shown in FIG. 4, the starting time for the terminal device to perform the PDCCH skipping can be a starting time of a next time unit after the terminal device completes transmission of uplink control information (UCI). The UCI is a feedback for the physical downlink shared channel (PDSCH). That is, if the first PDCCH received by the terminal device indicates the downlink scheduling of the terminal device, the terminal device may stop monitoring the PDCCH since a next time unit after the reception of the PDSCH and the UCI feedback for the PDSCH are completed.

Figure 5:
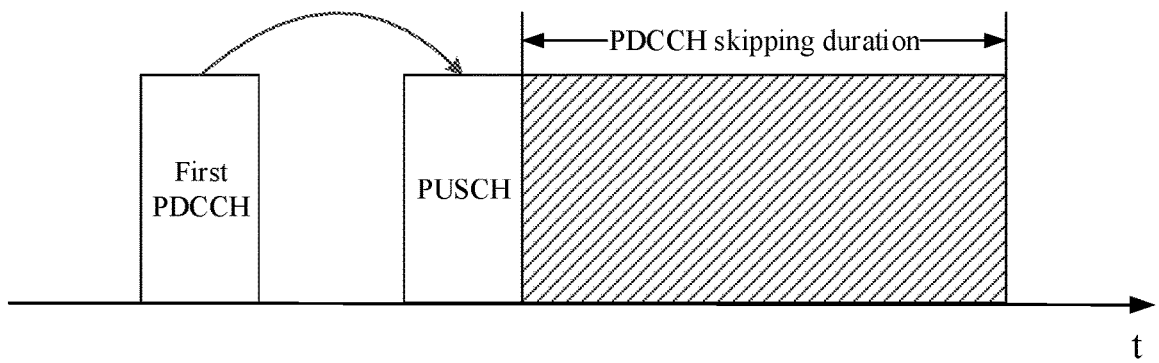
FIG. 5 is a schematic diagram illustrating another method of determining a starting time of PDCCH skipping according to embodiments of the present application.

If the first PDCCH schedules the uplink data transmission of the terminal device, as shown in FIG. 5, the starting time for the terminal device to perform the PDCCH skipping may be a starting time of a next time unit after the terminal device completes transmission of the PUSCH. That is, if the first PDCCH received by the terminal device indicates uplink scheduling of the terminal device, the terminal device stop monitoring the PDCCH since the next time unit after the transmission of the PUSCH is completed.

For the convenience of description, in the embodiments of the present application, the serving cell where the terminal device performs the PDCCH skipping is referred to as a first serving cell. The first serving cell includes at least one serving cell among multiple serving cells.

Two implementation manners for transmitting, by the network device, the first PDCCH on at least one serving cell among the multiple serving cells will be described in detail below.

In an implementation manner, the network device may transmit a first PDCCH on each serving cell among the multiple serving cells. Accordingly, the terminal device may receive a respective first PDCCH on each serving cell among the multiple serving cells. In this case, the number of the first PDCCHs is equal to the number of the multiple serving cells.

In such implementation manner, the first PDCCH received by the terminal device on each serving cell may give the terminal device an indication of performing the PDCCH skipping on the serving cell. In this case, the first serving cell refers to all the serving cells owned by the terminal device. For example, for a terminal device configured with the PCell, SCell 1 and SCell 2, the network device can transmit the first PDCCH for each serving cell of the terminal device, namely the PCell, SCell 1 and SCell 2. The first PDCCH received by the terminal device on the PCell may give the terminal device an indication of performing the PDCCH skipping on the PCell, the first PDCCH received by the terminal device on SCell 1 may give the terminal device an indication of performing the PDCCH skipping on SCell 1, and the first PDCCH received by the terminal device on SCell 2 may give the terminal device an indication of performing the PDCCH skipping on SCell 2. Accordingly, the terminal device may perform the PDCCH skipping according to the respective first PDCCH received on each serving cell.

Alternatively, the first PDCCH received by the terminal device on each serving cell may give the terminal device an indication of performing the PDCCH skipping on all of the serving cells. For example, for a terminal device configured with the PCell, SCell 1 and SCell 2, the network device may transmit the first PDCCH for the PCell, SCell 1 and SCell 2 respectively, and each first PDCCH received by the terminal device on the PCell, SCell 1 and SCell 2 can be used to give the terminal device an indication of performing the PDCCH skipping on the PCell, SCell 1 and SCell 2.

Alternatively, the first PDCCH received by the terminal device on each serving cell may give the terminal device an indication of performing the PDCCH skipping on some serving cells among the multiple serving cells. For example, for a terminal device configured with the PCell, SCell 1 and SCell 2, the network device transmits the first PDCCH for each serving cell of the terminal device. The first PDCCH received by the terminal device on the PCell gives the terminal device an indication of performing the PDCCH skipping on SCell 1 and SCell 2, the first PDCCH received by the terminal device on SCell 1 gives the terminal device an indication of performing the PDCCH skipping on SCell 1, and the first PDCCH received by the terminal device on SCell 2 gives the terminal device an indication of performing the PDCCH skipping on SCell 2. In this case, the first serving cell refers to SCell 1 and SCell 2.

In another implementation manner, the network device may transmit the first PDCCH on some serving cells among the multiple serving cells, and accordingly, the terminal device may receive the first PDCCH on some serving cells among the multiple serving cells.

As an example, if the first serving cell includes N serving cells, and the N serving cells are part of the multiple serving cells (N is a positive integer greater than 1), then the network device may transmit the first PDCCH on each of the first serving cell respectively. For example, if a terminal device is configured with the PCell, SCell 1 and SCell 2, and the first serving cell includes the PCell and SCell 1, then the network device can transmit the first PDCCH to the terminal device on the PCell and SCell 1 respectively. Accordingly, the terminal device may receive the first PDCCH on the PCell and SCell 1 respectively.

As another example, the terminal device may receive the first PDCCH on one serving cell among the multiple serving cells. Optionally, the one serving cell may be the PCell. Then, the terminal device may perform the PDCCH skipping on the first serving cell according to the first PDCCH. For example, if a terminal device is configured with the PCell, SCell 1 and SCell 2, and the first serving cell includes the PCell, SCell 1 and SCell 2, then the terminal device receives the first PDCCH on the PCell, and then performs the PDCCH skipping on the PCell, SCell 1 and SCell 2 based on the indication of the first PDCCH. In this case, the number of the first PDCCH is 1.

In some embodiments of the present application, if the first serving cell includes N serving cells, the terminal device may have the same first PDCCH skipping duration value on the N serving cells.

In some embodiments of the present application, if the first serving cell includes N serving cells, the terminal device may have different first PDCCH skipping duration values on at least two serving cells among the N serving cells. For example, if a terminal device is configured with the PCell, SCell 1 and SCell 2, and the terminal device receives the first PDCCH on the PCell, then the terminal device can perform the PDCCH skipping on the PCell, SCell 1 and SCell 2 according to the indication of the first PDCCH. In this case, the first PDCCH skipping duration value of the terminal device on the PCell and SCell 1 is 8 slots, and the first PDCCH skipping duration value of the terminal device on SCell 2 is 16 slots.

In some embodiments, the first PDCCH may also be used for indicating the first serving cell, that is, the first PDCCH may also indicate the serving cell(s) on which the terminal device performs the PDCCH skipping. For example, the first PDCCH indicates that the first serving cell is the PCell.

Alternatively, the first PDCCH may not indicate the first serving cell, and the first serving cell may be stipulated by the protocol. In this case, the first serving cell may be the multiple serving cells, or the first serving cell is the PCell, or the first serving cell is all the SCells, or the first serving cell is some serving cells among the SCells.

In some embodiments, for a serving cell where the PDCCH skipping is required, that is, the first serving cell, the terminal device may have the same or different starting time of the PDCCH skipping on each serving cell of the first serving cell, which is not specifically limited in the present disclosure.

The technical solutions of the embodiments of the present application will be described in detail below with reference to three specific examples.

Embodiment 1

For a terminal device configured with multiple serving cells, the network device may transmit the first PDCCH on each serving cell of the terminal device to give the terminal device an indication of performing the PDCCH skipping on each serving cell.

Figure 6:
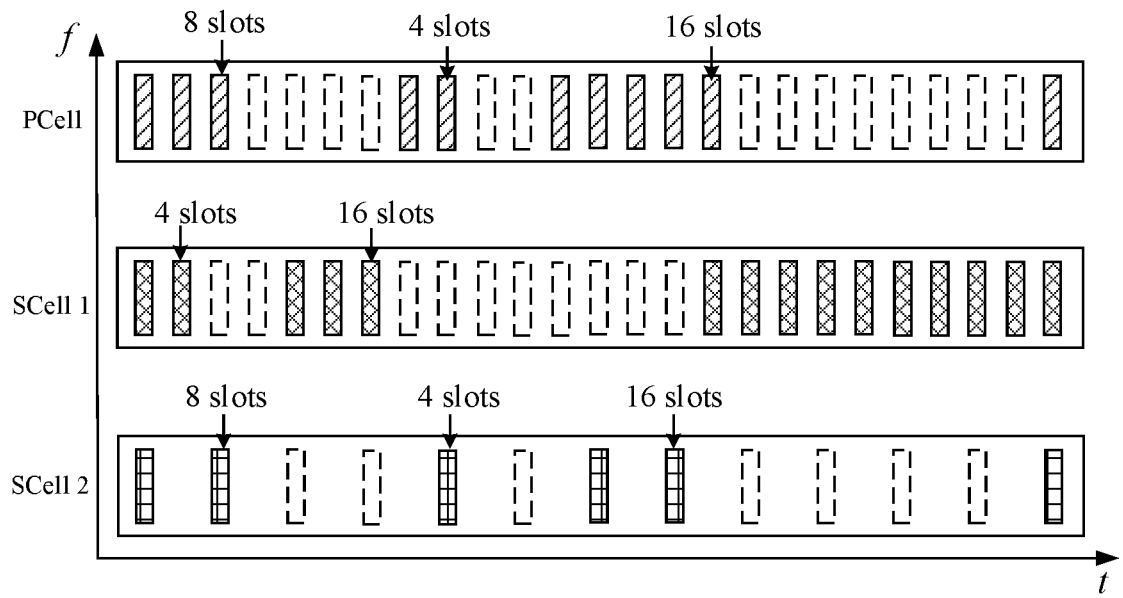
FIG. 6 is a schematic diagram illustrating a method for monitoring a control channel according to embodiments of the present application.

Specifically, as shown in FIG. 6, in step 1, the terminal device receives the RRC configuration information transmitted from the network device. The RRC configuration information includes:

(a) SCell configuration: 2 SCells, that is, SCell 1 and SCell 2;

(b) DL BWP configuration of each serving cell: one DL BWP is configured for the PCell and each SCell respectively;

(c) PDCCH search space configuration on the DL BWP for each serving cell: for the DL BWP on each of the PCell and the SCells, one PDCCH search space is configured; the PDCCH monitoring period corresponding to the PDCCH search space of the DL BWP on the PCell and SCell 1 is 2 slots, and the PDCCH monitoring period corresponding to the PDCCH search space of the DL BWP on SCell 2 is 4 slots;

(d) PDCCH skipping duration configuration of each serving cell: for each serving cell, four PDCCH skipping duration values are configured respectively; for the PCell, the four PDCCH skipping duration values configured are 2 slots, 4 slots, 8 slots, and 16 slots; for SCell 1 and SCell 2, the four PDCCH skipping duration values configured are 4 slots, 8 slots, 16 slots and 32 slots.

In step 2, the terminal device monitors the PDCCH on the PDCCH search space of the PCell, SCell 1 and SCell 2. If the first PDCCH received by the terminal device contains PDCCH skipping indication information, the terminal device will not monitor the PDCCH in a subsequent period based on the indication of the first PDCCH received.

For example, the terminal device monitors the PDCCH on the PCell, and when the first PDCCH received by the terminal device on the PCell indicates that the PDCCH skipping duration of the terminal device is 8 slots, the terminal device will not monitor the PDCCH on the PCell in next 8 slots. Subsequently, the terminal device receives the first PDCCH on the PCell again, and the first PDCCH indicates that the PDCCH skipping duration of the terminal device is 4 slots, then the terminal device will not monitor the PDCCH on the PCell in next 4 slots. Next, the first PDCCH received by the terminal device on the PCell indicates that the PDCCH skipping duration of the terminal device is 16 slots, then the terminal device will not monitor the PDCCH on the PCell in next 16 slots.

Similarly, the terminal device monitors the PDCCH on SCell 1, and when the first PDCCH received by the terminal device on SCell 1 indicates that the PDCCH skipping duration of the terminal device is 4 slots, the terminal device will not monitor the PDCCH on SCell 1 in next 4 slots. Next, the first PDCCH received by the terminal device on SCell 1 indicates that the PDCCH skipping duration of the terminal device is 16 slots, then the terminal device will not monitor the PDCCH on SCell 1 in next 16 slots.

The terminal device monitors the PDCCH on SCell 2, and when the first PDCCH is received by the terminal device on the SCell 2 and the first PDCCH indicates that the PDCCH skipping duration of the terminal device is 8 slots, the terminal device will not monitor the PDCCH on SCell 2 in next 8 slots. Subsequently, the terminal device receives the first PDCCH on SCell 2 again, and the first PDCCH indicates that the PDCCH skipping duration of the terminal device is 4 slots, then the terminal device will not monitor the PDCCH on SCell 2 in next 4 slots. Next, the first PDCCH received by the terminal device on SCell 2 indicates that the PDCCH skipping duration of the terminal device is 16 slots, then the terminal device will not monitor the PDCCH on SCell 2 in next 16 slots.

The technical solution of Embodiment 1 can flexibly control the PDCCH skipping of the terminal device on each serving cell, so that the technical solution of Embodiment 1 has a larger energy-saving gain.

Embodiment 2

For a terminal device configured with multiple serving cells, the network device transmits the first PDCCH on the PCell to give the terminal device an indication of performing the PDCCH skipping on some or all of the serving cells, where the terminal device has the same PDCCH skipping duration value on all serving cells.

Figure 7:
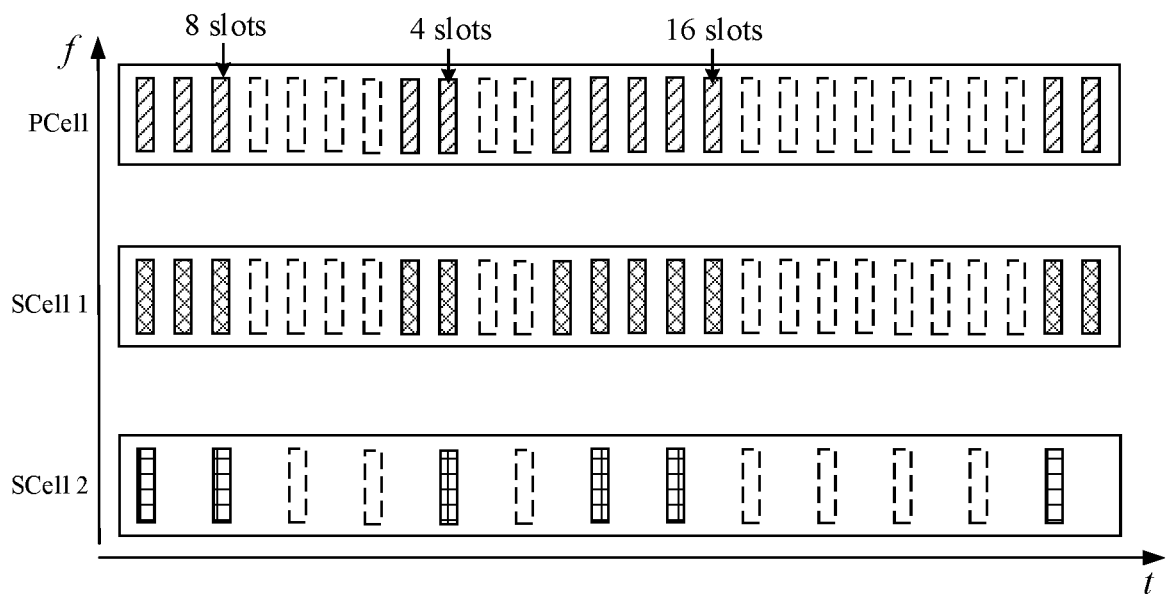
FIG. 7 is a schematic diagram illustrating another method for monitoring a control channel according to embodiments of the present application.

Specifically, referring to FIG. 7, in step 1, the terminal device receives the RRC configuration information transmitted from the network device. The RRC configuration information includes:
  (a) SCell configuration: 2 SCells, that is, SCell 1 and SCell 2;
  (b) DL BWP configuration of each serving cell: one DL BWP is configured for the PCell and each SCell respectively;
  (c) PDCCH search space configuration on the DL BWP for each serving cell: for each of the DL BWP on the PCell and the SCells, one PDCCH search space is configured; the PDCCH monitoring period corresponding to the PDCCH search space of the DL BWP on the PCell and SCell 1 is 2 slots, and the PDCCH monitoring period corresponding to the PDCCH search space of the DL BWP on SCell 2 is 4 slots;
  (d) PDCCH skipping duration configuration: four PDCCH skipping duration values are configured for the terminal device, which are 4 slots, 8 slots, 16 slots and 32 slots.

In step 2, the terminal device monitors the PDCCH on the PDCCH search space of the PCell. If the first PDCCH received by the terminal device contains the PDCCH skipping indication information, based on the indication of the first PDCCH received, the terminal device will not monitor the PDCCH on some or all of the serving cells in a subsequent period.

For example, if the terminal device receives the first PDCCH on the PCell, and the first PDCCH indicates that the PDCCH skipping duration of the terminal device is 8 slots, then the terminal device will not monitor the PDCCH on the PCell, SCell 1 and SCell 2 in next 8 slots. Subsequently, the terminal device receives, on the PCell, the first PDCCH indicating that the PDCCH skipping duration of the terminal device is 4 slots, then the terminal device will not monitor the PDCCH on the PCell, SCell 1 and SCell 2 in next 4 slots. Next, the terminal device receives, on the PCell, the first PDCCH indicating that the PDCCH skipping duration of the terminal device is 16 slots, then the terminal device will not monitor the PDCCH on the PCell, SCell 1 and SCell 2 in next 16 slots.

As can be seen that the network device in Embodiment 1 can configure a set of PDCCH skipping duration parameters for each serving cell of the terminal device, while the network device in Embodiment 2 can configure only one set of PDCCH skipping duration parameters for the terminal device.

In the technical solution of Embodiment 2, by transmitting a dynamic signaling on the PCell, the terminal device is controlled to perform the PDCCH skipping on some or all the serving cells. The PDCCH skipping duration of the terminal device on all the first serving cells is the same, and the PDCCH skipping duration can be dynamically adjusted. Compared with the solution in Embodiment 1, the signaling overhead is relatively small.

Embodiment 3

For a terminal device configured with multiple serving cells, the network device can transmit the first PDCCH on the PCell of the terminal device to give the terminal device an indication of performing the PDCCH skipping on some or all the serving cells, and the terminal device may have different PDCCH skipping durations on each serving cell.

Figure 8:
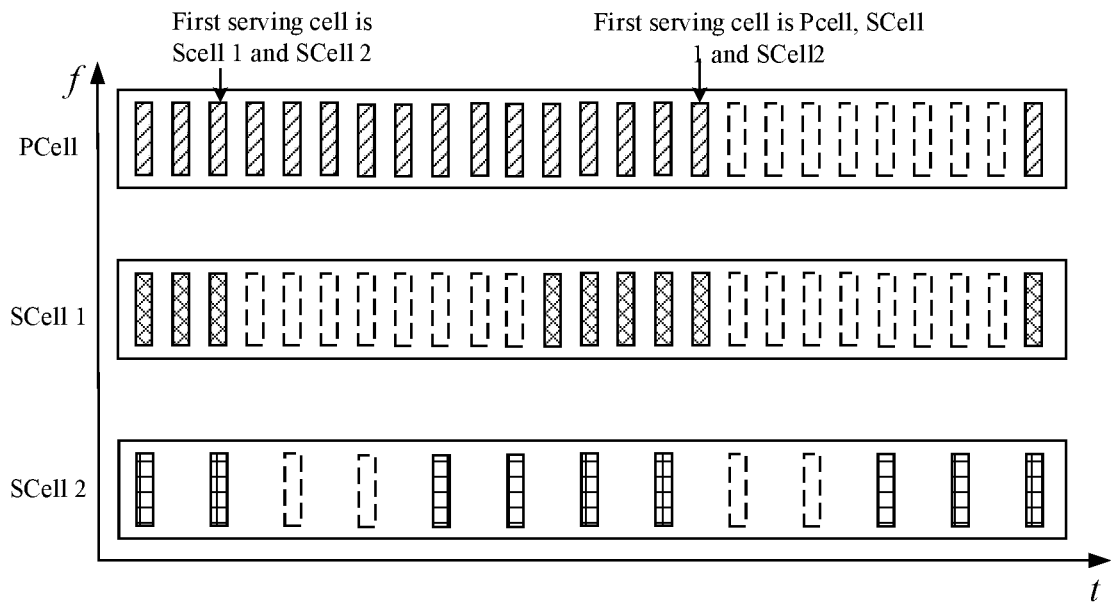
FIG. 8 is a schematic diagram illustrating another method for monitoring a control channel according to embodiments of the present application.

Specifically, referring to FIG. 8, in step 1, the terminal device receives the RRC configuration information transmitted from the network device. The RRC configuration information includes:
  (a) SCell configuration: 2 SCells, that is, SCell 1 and SCell 2;
  (b) DL BWP configuration of each serving cell: one DL BWP is configured for the PCell and each SCell respectively;
  (c) PDCCH search space configuration on the DL BWP for each serving cell: for each of the DL BWP on the PCell and the SCells, one PDCCH search space is configured; the PDCCH monitoring period corresponding to the PDCCH search space of the DL BWP on the PCell and SCell 1 is 2 slots, and the PDCCH monitoring period corresponding to the PDCCH search space of the DL BWP on SCell 2 is 4 slots;
  (d) PDCCH skipping duration configuration of each serving cell: the PDCCH skipping duration value on the PCell and SCell 1 is 16 slots, and the PDCCH skipping duration value on SCell 2 is 8 slots.

In step 2, the terminal device monitors the PDCCH on the PDCCH search space of the PCell. If the first PDCCH received by the terminal device contains the PDCCH skipping indication information, the terminal device will not monitor the PDCCH on some or all of the serving cells in a next period according to the indication of the first PDCCH received.

For example, the terminal device receives the first PDCCH on the PCell, and the first PDCCH gives the terminal device an indication of performing the PDCCH skipping on SCell 1 and SCell 2, then the terminal device will not monitor the PDCCH on SCell 1 in next 16 slots, and the terminal device will not monitor the PDCCH on SCell 2 in next 8 slots. Subsequently, the terminal device receives, on the PCell, an indication of the first PDCCH of performing the PDCCH skipping on all the serving cells, then the terminal device will not monitor the PDCCH on the PCell and SCell 1 in next 16 slots, and the terminal device will not monitor the PDCCH on SCell 2 in next 8 slots.

In the technical solution of Embodiment 3, since the first PDCCH may not be used for indicating the first PDCCH skipping duration value, the signaling overhead of Embodiment 3 is minimum.

It should be understood that the specific examples in Embodiment 1, Embodiment 2 and Embodiment 3 are only for helping those skilled in the art to better understand the embodiments of the present application, rather than limiting the scope of the embodiments of the present application.

It should also be understood that, in addition to the PDCCH, the signaling used to give the terminal device an indication of performing the PDCCH skipping may also be other dynamic signaling, such as MAC CE.

In the embodiments of the present application, for a terminal device configured with multiple serving cells, the network device may transmit the PDCCH for giving the terminal device an indication of performing the PDCCH skipping to the terminal device, the terminal device may not monitor the PDCCH in a period after receiving the PDCCH. Thus, it is possible to dynamically support the power saving of the terminal device, that is, to reduce the power consumption of the terminal device.

The preferred embodiments of the present application are described in detail above in conjunction with the accompanying drawings. However, the present application is not limited to the specific details in the foregoing embodiments. Within the scope of the technical concept of the present application, many simple modifications can be made to the technical solution of the present application. These simple modifications all belong to the protection scope of the present application.

For example, the specific technical features described in the above specific embodiments can be combined in any suitable manner without contradiction. In order to avoid unnecessary repetition, various possible combinations are not discussed in the present application.

As another example, various different implementations of the present application can also be combined arbitrarily, as long as they do not violate the idea of the present application, and should also be regarded as the content disclosed in the present application.

It should be understood that in the various embodiments of the present application, the sequence number of the above-mentioned processes does not mean a chronological order, and the chronological order of each process should be determined by its function and internal logic, and should not constitute any limitation to the embodiments of the present application.

The communication method according to the embodiments of the present application is described in detail above. The communication device according to the embodiments of the present application will be described below in conjunction with FIG. 9 to FIG. 11. The technical features described in the method embodiments are applicable to the following device embodiments.

Figure 9:
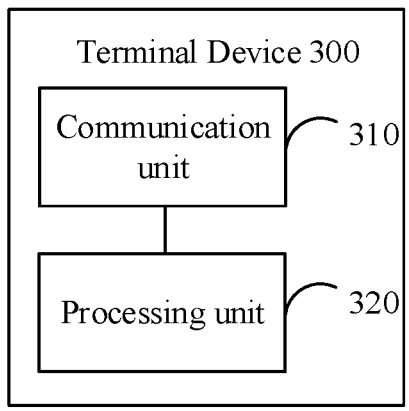
FIG. 9 is a schematic block diagram illustrating a terminal device according to embodiments of the present application.

FIG. 9 is a schematic block diagram illustrating a terminal device 300 according to embodiments of the present application. As shown in FIG. 9, the terminal device 300 includes:

a communication unit 310, configured to receive, in a PDCCH search space, a first PDCCH on at least one serving cell among multiple serving cells, and the first PDCCH is used for providing the terminal device a PDCCH skipping indication;

a processing unit 320, configured to perform PDCCH skipping according to indication of the first PDCCH.

In some embodiments of the present application, the first PDCCH is also used for indicating the processing unit 320 a PDCCH skipping duration.

In some embodiments of the present application, the communication unit 310 is further configured to: receive a respective first PDCCH on each of the multiple serving cells respectively.

In some embodiments of the present application, the processing unit 320 is further configured to: perform the PDCCH skipping on each serving cell according to the respective first PDCCH received on each serving cell.

In some embodiments of the present application, the communication unit 310 is further configured to: receive the first PDCCH on one of the multiple serving cells.

In some embodiments of the present application, the processing unit 320 is further configured to: according to the indication of the first PDCCH on one of the serving cells, perform the PDCCH skipping on a first serving cell, where the first serving cell includes at least one serving cell among the multiple serving cells.

In some embodiments of the present application, the first PDCCH is also used for indicating the first serving cell.

In some embodiments of the present application, the first serving cell refers to the multiple serving cells.

In some embodiments of the present application, the first serving cell includes N serving cells, and the processing unit 320 has the same PDCCH skipping duration on the N serving cells, where N is a positive integer greater than 1.

In some embodiments of the present application, the first serving cell includes N serving cells, and the processing unit 320 has different PDCCH skipping durations on at least two serving cells among the N serving cells, where N is a positive integer greater than 1.

In some embodiments of the present application, the communication unit 310 is further configured to: receive the first PDCCH on a primary cell among the multiple serving cells.

In some embodiments of the present application, the processing unit 320 is configured to perform the PDCCH skipping since a starting time of a next time unit after PUSCH transmission or PUCCH transmission scheduled by the first PDCCH succeeds.

In some embodiments of the present application, if the first PDCCH schedules the downlink data transmission of the terminal device 300, the processing unit 320 is configured to perform the PDCCH skipping since a starting time of a next time unit after the communication unit 310 completes a transmission of UCI, where the UCI is a feedback for the PDSCH.

In some embodiments of the present application, if the first PDCCH schedules the uplink data transmission of the terminal device, the processing unit 320 is configured to perform the PDCCH skipping since a starting time of a next time unit after the communication unit 310 completes a transmission of the PUSCH.

In some embodiments of the present application, the processing unit 320 is configured to perform the PDCCH skipping since a starting time of a next time unit after the first PDCCH is received by the communication unit 310.

In some embodiments of the present application, the time unit is a subframe, a slot, a time domain symbol, or a short transmission timing interval.

In some embodiments of the present application, the communication unit 310 is further configured to receive radio resource control (RRC) configuration information, where the RRC configuration information includes the PDCCH skipping duration of the processing unit 320.

In some embodiments of the present application, the RRC configuration information includes a duration set. The duration set includes PDCCH skipping durations of the processing unit 320. The first PDCCH is also used for indicating indexes of PDCCH skipping durations of the processing unit 320 in the duration set.

It should be understood that the terminal device 300 may correspond to the terminal device in the method 200, and can implement corresponding operations of the terminal device in the method 200. For the sake of brevity, details are not described herein again.

Figure 10:
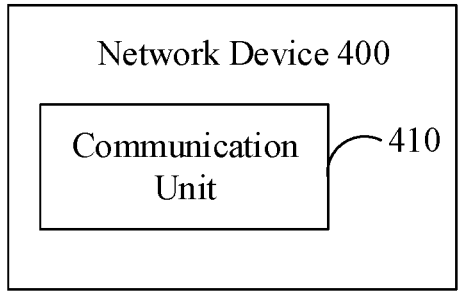
FIG. 10 is a schematic block diagram illustrating a network device according to embodiments of the present application.

FIG. 10 is a schematic block diagram illustrating a network device 400 according to embodiments of the present application. As shown in FIG. 10, the network device 400 includes:

a communication unit 410, configured to transmit, in a PDCCH search space, a first PDCCH on at least one serving cell among multiple serving cells, and the first PDCCH is used for providing the terminal device an PDCCH skipping indication.

In some embodiments of the present application, the first PDCCH is also used for indicating the terminal device a PDCCH skipping duration.

In some embodiments of the present application, the communication unit 410 is further configured to: transmit a respective first PDCCH on each of the multiple serving cells respectively.

In some embodiments of the present application, the communication unit 410 is further configured to: transmit the first PDCCH on one of the multiple serving cells.

In some embodiments of the present application, the first PDCCH is also used to give the terminal device an indication of performing the PDCCH skipping on a first serving cell, where the first serving cell includes at least one serving cell among the multiple serving cells.

In some embodiments of the present application, the first serving cell refers to the multiple serving cells.

In some embodiments of the present application, the first serving cell includes N serving cells, and the first PDCCH is also used for indicating that the terminal device has the same PDCCH skipping durations on the N serving cells, where N is a positive integer greater than 1.

In some embodiments of the present application, the first serving cell includes N serving cells, and the first PDCCH is also used for indicating that the terminal device has different PDCCH skipping duration on at least two serving cells among the N serving cells, where N is a positive integer greater than 1.

In some embodiments of the present application, the communication unit 410 is further configured to: transmit the first PDCCH on a primary cell among the multiple serving cells.

In some embodiments of the present application, the communication unit 410 is further configured to transmit radio resource control (RRC) configuration information to the terminal device, where the RRC configuration information includes the PDCCH skipping duration of the terminal device.

In some embodiments of the present application, the RRC configuration information includes a duration set. The duration set includes PDCCH skipping durations of the terminal device. The first PDCCH is also used for indicating indexes of the PDCCH skipping durations of the terminal device in the duration set.

It should be understood that the network device 400 may correspond to the network device in the method 200, and can implement corresponding operations of the network device in the method 200. For the sake of brevity, details are not described herein again.

Figure 11:
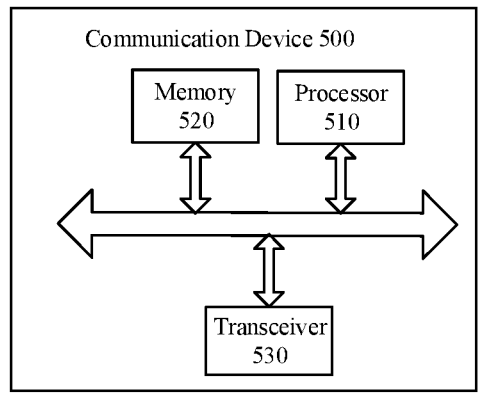
FIG. 11 is a schematic block diagram illustrating a communication device according to embodiments of the present application.

FIG. 11 is a schematic structural diagram illustrating a communication device 500 provided by embodiments of the present disclosure. The communication device 500 shown in FIG. 11 includes a processor 510. The processor 510 may call a computer program from a memory and run the computer program to implement the method provided in the embodiments of the present disclosure.

In some embodiments, as shown in FIG. 11, the communication device 500 may further include a memory 520. The processor 510 may call the computer program from the memory 520 and run the computer program to implement the method provided in the embodiments of the present disclosure.

The memory 520 may be separated from the processor 510, or may be integrated into the processor 510.

In some embodiments, as shown in FIG. 11, the communication device 500 may further include a transceiver 530, and the processor 510 may control the transceiver 530 to communicate with other devices. Specifically, the transceiver 530 may transmit information or data to other devices, or receive information or data transmitted from other devices.

The transceiver 530 may include a transmitter and a receiver. The transceiver 530 may further include antennas, and the number of antennas may be one or more.

In some embodiments, the communication device 500 may be the network device of the embodiments of the present application, and may implement the corresponding process implemented by the network device in each method of the embodiments of the present application. For the sake of brevity, details are not repeated here.

In some embodiments, the communication device 500 may be the terminal device of the embodiments of the present application, and may implement the corresponding process implemented by the terminal device in each method of the embodiments of the present application. For the sake of brevity, details are not repeated here.

Figure 12:
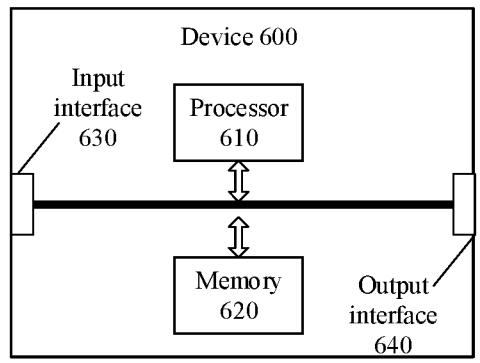
FIG. 12 is a schematic block diagram illustrating a chip according to embodiments of the present application.

FIG. 12 is a schematic structural diagram of a device provided by an embodiment of the present disclosure. The device 600 shown in FIG. 12 includes a processor 610. The processor 610 may call a computer program from a memory and run the computer program to implement the method provided in the embodiments of the present disclosure.

In some embodiments, as shown in FIG. 12, the device 600 may further include a memory 620. The processor 610 may call the computer program from the memory 620 and run the computer program to implement the method provided in the embodiments of the present disclosure.

The memory 620 may be a device separated from the processor 610, or may be integrated into the processor 610.

In some embodiments, the device 600 may further include an input interface 630. The processor 610 can control the input interface 630 to communicate with other devices or chips, and specifically, can obtain information or data transmitted from other devices or chips.

In some embodiments, the device 600 may further include an output interface 640. The processor 610 can control the output interface 640 to communicate with other devices or chips, and specifically, can output information or data to other devices or chips.

In some embodiments, the device may be applied to the terminal device in the embodiments of the present disclosure, and may implement the corresponding process implemented by the terminal device in each method of the embodiments of the present disclosure. For the sake of brevity, details are not repeated here.

In some embodiments, the device may be applied to the network device in the embodiments of the present disclosure, and may implement the corresponding process implemented by the network device in each method of the embodiments of the present disclosure. For the sake of brevity, details are not repeated here.

In some embodiments, the device 600 may be a chip. It should be understood that the chip mentioned in the embodiments of the present application may also be called as a System on Chip, a System on a Chip etc.

It should be understood that the processor of the embodiments of the present disclosure may be an integrated circuit chip with signal processing capability. In the implementation process, the steps of the foregoing method embodiments can be performed by hardware integrated logic circuits in the processor or instructions in the form of software. The above-mentioned processor can be a general-purpose processor, a digital signal processor (DSP), an application specific integrated circuit (ASIC), a field programmable gate array (FPGA) or other programmable logic devices, discrete gates or transistor logic devices, discrete hardware components. The methods, steps, and logical block diagrams disclosed in the embodiments of the present application can be implemented or executed. The general-purpose processor may be a microprocessor or the processor may also be any conventional processor or the like. The steps of the method disclosed in the embodiments of the present application can be directly executed by a hardware decoding processor, or executed by a combination of hardware and software modules in the decoding processor. The software module can be located in a mature storage medium in the field such as a random access memory, a flash memory, a read-only memory, a programmable read-only memory, or an electrically erasable programmable memory, registers. The storage medium is located in the memory, and the processor reads the information in the memory and completes the steps of the above method in combination with its hardware.

It should be understood that the memory in the embodiments of the present disclosure may be volatile memory or non-volatile memory, or may include both volatile and non-volatile memory. The non-volatile memory can be a read-only memory (ROM), a programmable read-only memory (PROM), an erasable programmable read-only memory (EPROM), and an Electrically Erasable programmable read-only memory (EEPROM) or a flash memory. The volatile memory may be a random access memory (RAM), which is used as an external cache. By way of example, but not limitation, many forms of RAM are available, such as a static random access memory (SRAM), a dynamic random access memory (DRAM), a Synchronous DRAM (SDRAM), a Double Data Rate SDRAM (DDR SDRAM), an Enhanced SDRAM (ESDRAM), a Synchlink DRAM (SLDRAM) and a Direct Rambus RAM (DR RAM). It should be noted that the memories of the systems and methods described herein are intended to include, but are not limited to, these memories and any other suitable types of memories.

It should be understood that the above memories are exemplary rather than limitation. For example, the memory in the embodiments of the present disclosure may be a static RAM(SRAM), a dynamic RAM (DRAM), a Synchronous DRAM (SDRAM), a Double Data Rate SDRAM (DDR SDRAM), an Enhanced SDRAM (ESDRAM), a Synchlink DRAM (SLDRAM) and a Direct Rambus RAM (DR RAM) and so on. In other words, the memories in the embodiments of the present disclosure are intended to include, but are not limited to, these memories and any other suitable types of memories.

Figure 13:
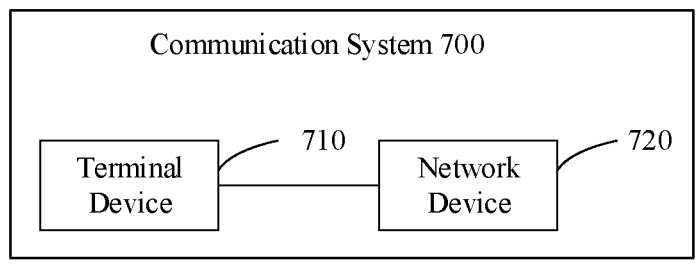
FIG. 13 is a schematic block diagram illustrating a communication system according to embodiments of the present application.

FIG. 13 is a schematic block diagram illustrating a communication system 700 provided by an embodiment of the present disclosure. As shown in FIG. 13, the communication system 700 includes a terminal device 710 and a network device 720.

The terminal device 710 may implement corresponding functions performed by the terminal device in methods described above, and the network device 720 may implement corresponding functions performed by the network device in the methods described above. For the sake of brevity, details are not repeated here.

The embodiments of the present disclosure further provide a computer readable storage medium for storing computer programs.

Optionally, the computer readable storage medium may be applied to the terminal device provided in the embodiments of the present disclosure, and the computer programs cause the computer to execute the corresponding process implemented by the terminal device in each method of the embodiments of the present disclosure. For brevity, details are not described herein again.

Optionally, the computer readable storage medium may be applied to the network device provided in the embodiments of the present disclosure, and the computer programs cause the computer to execute the corresponding process implemented by the network device in each method of the embodiments of the present disclosure. For brevity, details are not described herein again.

The embodiments of the present disclosure further provide a computer program product including computer program instructions.

Optionally, the computer program product may be applied to the terminal device provided in the embodiments of the present disclosure, and the computer program instructions cause the computer to execute the corresponding process implemented by the terminal device in each method of the embodiments of the present disclosure. For brevity, details are not described herein again.

Optionally, the computer program product may be applied to the network device provided in the embodiments of the present disclosure, and the computer program instructions cause the computer to execute the corresponding process implemented by the network device in each method of the embodiments of the present disclosure. For brevity, details are not described herein again.

The embodiments of the present application further provide a computer program.

Optionally, the computer program may be applied to the terminal device provided in the embodiments of the present disclosure, and the computer program, when run on a computer, causes the computer to execute the corresponding process implemented by the terminal device in each method of the embodiments of the present disclosure. For brevity, details are not described herein again.

Optionally, the computer program may be applied to the network device provided in the embodiments of the present disclosure, and the computer program, when run on a computer, causes the computer to execute the corresponding process implemented by the network device in each method of the embodiments of the present disclosure. For brevity, details are not described herein again.

Those skilled in the art may realize that the units and algorithm steps of the examples described in combination with the embodiments can be implemented by electronic hardware or a combination of computer software and electronic hardware. Whether these functions are executed by hardware or software depends on the specific application and design constraints of the technical solution. Professionals and technicians can use different methods for each specific application to implement the described functions, but such implementation should not be considered beyond the scope of this application.

Those skilled in the art can clearly understand that, for convenience and concise description, the specific working process of the above-described system, device, and units can refer to the corresponding process in the foregoing method embodiment, and details are not repeated herein.

In some embodiments provided in the present disclosure, it should be understood that the proposed system, device, and method may be implemented in other ways. For example, the device embodiments described above are merely illustrative. For example, the division of the units is only a logical function division, and there may be other divisions in actual implementation, for example, multiple units or components may be combined or can be integrated into another system, or some features can be ignored or not implemented. In addition, the displayed or discussed mutual coupling or direct coupling or communication connection may be indirect coupling or communication connection through some interfaces, devices or units, and may be in electrical, mechanical or other forms.

The units described as separated components may or may not be physically separated, and the components displayed as units may or may not be physical units, that is, they may be located at one place, or they may be distributed on multiple network units. Some or all of the units may be selected according to actual needs to achieve the objectives of the solutions of the embodiments.

In addition, the functional units in the various embodiments of the present disclosure may be integrated into one processing unit, or the units are separated physically, or two or more units may be integrated into one unit.

If the function is implemented in the form of a software functional unit and sold or used as an independent product, it can be stored in a computer readable storage medium. In view of this, the technical solution of this application in essence or the part that contributes to the prior art or the part of the technical solution can be embodied in the form of a software product, and the computer software product is stored in a storage medium. The storage medium includes several instructions so that a computer (which may be a personal computer, a server, or a network device, etc.) executes all or part of the steps of the methods described in the various embodiments of the present disclosure. The aforementioned storage medium includes: U disk, mobile hard disk drive, Read-Only Memory (ROM), Random Access Memory (RAM), magnetic disks or optical disks and other media that can store program codes.

The foregoing descriptions are merely exemplary implementations of the present disclosure, but the protection scope of the present disclosure is not limited thereto. Any changes or substitutions easily conceived by those skilled in the art based on the contents of the present disclosure fall within the protection scope of the present disclosure. Therefore, the protection scope of the present disclosure shall be defined by the appended claims.

What is claimed is:

1. A method for monitoring a control channel, comprising:
   in a physical downlink control channel (PDCCH) search space, receiving, by a terminal device, a first PDCCH on at least one serving cell among multiple serving cells, wherein the first PDCCH is used for indicating PDCCH skipping to the terminal device; and
   performing, by the terminal device, the PDCCH skipping according to indication of the first PDCCH,
   wherein the method further comprises:
   receiving, by the terminal device, radio resource control (RRC) configuration information,
   wherein the RRC configuration information comprises a duration set, and the duration set comprises durations of performing the PDCCH skipping by the terminal device, the first PDCCH is further used for indicating indexes of durations, in the duration set, for performing the PDCCH skipping by the terminal device.

2. The method according to claim 1, wherein receiving, by the terminal device, the first PDCCH on at least one serving cell among multiple serving cells comprises:
   receiving, by the terminal device, a respective first PDCCH on each serving cell among the multiple serving cells.

3. The method according to claim 2, wherein performing, by the terminal device, the PDCCH skipping according to the indication of the first PDCCH comprises:
   performing, by the terminal device, the PDCCH skipping on each serving cell according to the respective first PDCCH received on each of the serving cells.

4. The method according to claim 1, wherein receiving, by the terminal device, the first PDCCH on at least one serving cell among multiple serving cells comprises:
   receiving, by the terminal device, the first PDCCH on one serving cell among the multiple serving cells.

5. The method according to claim 4, wherein performing, by the terminal device, the PDCCH skipping according to the indication of the first PDCCH comprises:
   performing, by the terminal device, the PDCCH skipping on a first serving cell according to the indication of the first PDCCH on the one serving cell, wherein the first serving cell comprises at least one serving cell among the multiple serving cells.

6. A terminal device, comprising a processor and a memory, wherein the memory is configured to store a computer program, and the processor is configured to call the computer program stored in the memory and run the computer program, to execute operations of:
   in a physical downlink control channel (PDCCH) search space, receiving a first PDCCH on at least one serving cell among multiple serving cells, wherein the first PDCCH is used for indicating PDCCH skipping to the terminal device; and
   performing PDCCH skipping according to indication of the first PDCCH,
   wherein the processor is further configured to execute operations of:
   receiving radio resource control (RRC) configuration information,
   wherein the RRC configuration information comprises a duration set, and the duration set comprises durations of performing the PDCCH skipping by the terminal device, the first PDCCH is further used for indicating indexes of durations, in the duration set, for performing the PDCCH skipping by the terminal device.

7. The terminal device according to claim 6, wherein the processor is further configured to execute operations of:
   receiving a respective first PDCCH on each serving cell among the multiple serving cells.

8. The terminal device according to claim 7, wherein the processor is further configured to execute operations of:
   performing the PDCCH skipping on each serving cell according to the respective first PDCCH received on each of the serving cells.

9. The terminal device according to claim 6, wherein the processor is further configured to execute operations of:
   receiving the first PDCCH on one serving cell among the multiple serving cells.

10. The terminal device according to claim 9, wherein the processor is further configured to execute operations of:
   according to the indication of the first PDCCH on the one serving cell, performing the PDCCH skipping on a first serving cell, wherein the first serving cell comprises at least one serving cell among the multiple serving cells.

11. A network device, comprising a processor and a memory, wherein the memory is configured to store a computer program, and the processor is configured to call the computer program stored in the memory and run the computer program, to execute operations of:
- in a physical downlink control channel (PDCCH) search space, transmitting a first PDCCH on at least one serving cell among multiple serving cells, wherein the first PDCCH is used for indicating PDCCH skipping to a terminal device,
- wherein the processor is further configured to execute operations of:
- transmitting radio resource control (RRC) configuration information to the terminal device,
- wherein the RRC configuration information comprises a duration set, and the duration set comprises durations for performing the PDCCH skipping by the terminal device, the first PDCCH is further used for indicating indexes of durations, in the duration set, for performing the PDCCH skipping by the terminal device.

12. The network device according to claim 11, wherein the processor is further configured to execute operation of: transmitting a respective first PDCCH on each serving cell among the multiple serving cells.

13. The network device according to claim 11, wherein the first PDCCH is further used for providing the terminal device an indication of performing the PDCCH skipping on a first serving cell, wherein the first serving cell comprises at least one serving cell among the multiple serving cells.

14. The network device according to claim 13, wherein the first serving cell refers to the multiple serving cells.

* * * * *